United States Patent [19]

Yagi et al.

[11] 4,247,829
[45] Jan. 27, 1981

[54] SILENT DISCHARGE TYPE GAS LASER DEVICE

[75] Inventors: Shigenori Yagi; Norikazu Tabata; Shuji Ogawa, all of Amagasaki, Japan

[73] Assignee: Mitsubishi Denki Kabushiki Kaisha, Tokyo, Japan

[21] Appl. No.: 946,329

[22] Filed: Sep. 27, 1978

[30] Foreign Application Priority Data

May 29, 1978 [JP] Japan ................................ 53-63987

[51] Int. Cl.$^3$ ............................................ H01S 3/097
[52] U.S. Cl. ............................................ 331/94.5 PE
[58] Field of Search ................. 331/94.5 PE, 94.5 D, 331/94.5 G

[56] References Cited

U.S. PATENT DOCUMENTS 3,745,481  7/1973  Erickson et al. ............. 331/94.5 PE

FOREIGN PATENT DOCUMENTS

51-6693  1/1976  Japan ................................. 331/94.5 G

Primary Examiner—James W. Davie
Attorney, Agent, or Firm—Oblon, Fisher, Spivak, McClelland & Maier

[57] ABSTRACT

A silent discharge type gas laser device comprises a high voltage side electrode and a low voltage side electrode which are disposed through a discharge space wherein substantial surface area of at least one of the electrodes is covered with a dielectric and an equivalent diameter of the covered dielectric is less than several times the length of the discharge space.

7 Claims, 17 Drawing Figures

SILENT DISCHARGE TYPE GAS LASER DEVICE

BACKGROUND OF THE INVENTION:

The present invention relates to an improvement of a silent discharge type gas laser device.

Referring to FIGS. 1 to 4, the conventional gas laser device especially a transversal excitation type $CO_2$ laser device will be illustrated.

Figure 1:
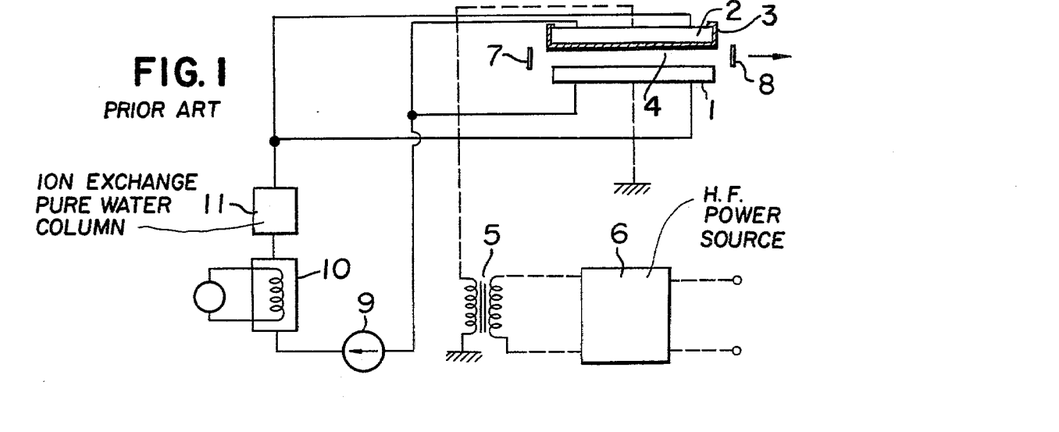
FIG. 1 is a circuit diagram of the conventional silent discharge type gas laser device.
Figure 2:
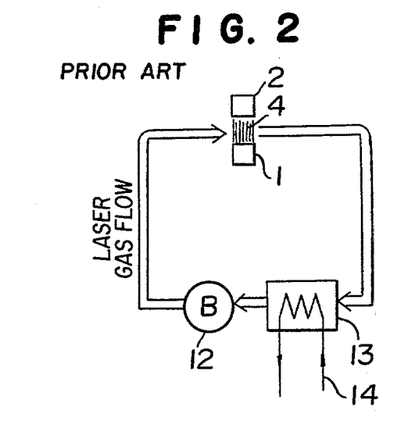
FIG. 2 is a diagram of a gas system.
Figure 3:
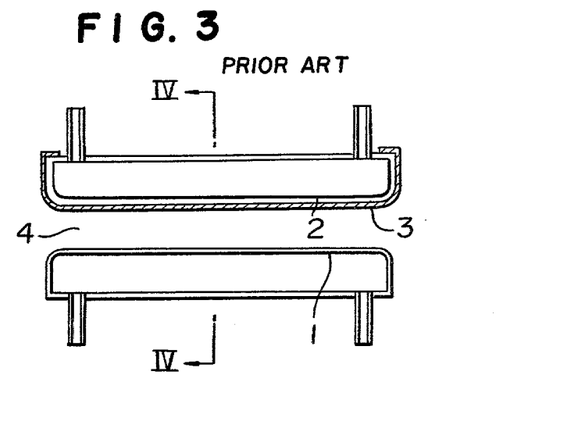
FIG. 3 is a sectional view of electrodes.

FIG. 1 is a circuit of the conventional gas laser device in principle and FIG. 2 is a diagram of a system for a laser gas, and FIG. 3 is a sectional view of an electrode for the gas laser device.

In FIG. 1, the reference numeral (1) designates a grounded metallic electrode; (2) designates a high voltage side electrode and the discharging surface of the high voltage side electrode (2) is coated with a dielectric (3); (4) designates a discharging space; (5) designates a transformer; (6) designates a high frequency power source. The output terminal of the high frequency power source (6) is connected to an input winding of the transformer 5. One of the output terminals of transformer is grounded and the high voltage at the other terminal is applied to the high voltage side electrode (2).

The reference numeral (7) designates a full reflector; (8) designates an output side reflector (partially transmitting); (9) designates a coolant water recycling pump; (10) designates a coolant water vessel; (11) designates an ion exchange type pure water column which is connected to the grounded metallic electrode (1) and the high voltage type metallic electrode (2) and the full reflector (7) is connected to the coolant water recycling pump (9).

In FIG. 1, the silent discharge as stable discharge results in the discharging space (4) by applying an AC high voltage from the high frequency power source (6) and the transformer (5) to the high voltage side electrode (2). The silent discharge is the AC discharge given through the dielectric between the grounded metallic electrode (1) and the high voltage side electrode (2) and the non-equilibrium discharge which has high electron temperature but low molecular temperature can be made stable without changing to the arc discharge.

The light inducing radiation created by molecules excited in the discharging space (4) is not described in detail. Thus, the laser oscillation results in a resonator comprising the full reflector (7) and the output side reflector (8) by the silent discharge in the discharging space (4) whereby the laser is radiated from the output side reflector (8). Both the grounded metallic electrode (1) and the high voltage side electrode (2) are cooled with a coolant water having low electric conductivity and the coolant water is recycled through the coolant water vessel (10) and the ion exchanger type pure water column (11) by the coolant water recycling pump (9). The ion exchanger type pure water column (11) is required to reduce the electric conductivity of the coolant water and to prevent current leakage from the high voltage side electrode (2).

FIG. 2 is a diagram of a system for the laser gas. In FIG. 2, the reference numeral (12) designates a blower and (13) designates a heat exchanger. The temperature of the laser gas is lowered by the heat exchanger (13) with the coolant water (14) and the speed of the laser gas is accelerated by the blower (12) and the laser gas having high speed is passed through the discharging space (4) perpendicularly to the discharge and the laser light. The speed of the laser gas in the discharging space (4) is at a high speed of about 30 ms$^{-1}$ whereby the excited molecules are uniformly distributed to the down flow side (5 to 2 mm) and elevation of the temperature of the laser gas caused by heat energy given by the discharge is suppressed. The $CO_2$ laser absorbance is rapidly increased by the elevation of the temperature of the laser gas whereby the energy efficiency of the laser oscillation is lowered. Accordingly, said feature is important for lowering the elevation of the temperature of the laser gas.

FIG. 3 is an enlarged sectional view of the grounded metallic electrode (1) and the high voltage side electrode (2).

Figure 4:
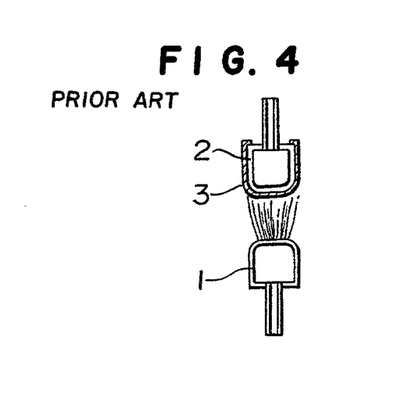
FIG. 4 is a sectional view taken along the line IV—IV of FIG. 3.

FIG. 4 is a sectional view taken along the line IV—IV of FIG. 3.

As it is clear from FIGS. 3 and 4, the discharging surfaces of both of the grounded metallic electrode (1) and the high voltage side electrode (2) are parallel flat planes whereby discharge uniformly results between the electrodes as shown in FIGS. 3 and 4.

In order to achieve laser oscillation, it is necessary to have laser gain for overcoming the losses by the full reflector (7) and the output side reflector (8) in the discharging space (4).

The laser gain is decided depending upon a length of the discharging space (4) in the optical axis and a discharge power density (discharge power per unit area). When the length of the discharging space in the optical axis is constant, laser oscillation does not results if the discharge power density is lower than the specific value.

In order to increase the discharge power density, either the frequency of the power source is increased or the applied voltage is increased or the electrostatic capacity of the dielectric is increased. The increase of applied voltage is limited because of the terminal insulation, and the electrostatic capacity of the dielectric is also limited because of the insulation durability and the dielectric constant of the material. Accordingly, it is necessary to use a higher frequency for increasing the discharge power density. Thus, the power frequency should be in a range of several tens KHz to 100 KHz.

The conventional silent discharge type laser device has the disadvantage of a higher power frequency. The higher power frequency causes higher cost of the high frequency power source (6) and greater power loss caused by the frequency conversion.

Accordingly, it is remarkably practical advantage to decrease the power frequency.

SUMMARY OF THE INVENTION

It is an object of the present invention to provide a gas laser device which imparts laser oscillation in a power frequency lower than that of the conventional gas laser by modifying the shapes of discharge electrodes.

The foregoing and other objects of the present invention have been attained by providing a silent discharge type gas laser device comprising a high voltage side electrode and a low voltage side electrode which are disposed in a discharging space, wherein substantial surface area of at least one of the electrodes is covered with a dielectric and an equivalent diameter of the covered dielectric is less than several times the length of the discharge space.

DETAILED DESCRIPTION OF THE PREFERRED EMBODIMENTS

Referring to the drawings, certain embodiments of the gas laser device of the present invention will be illustrated.

Figure 5:
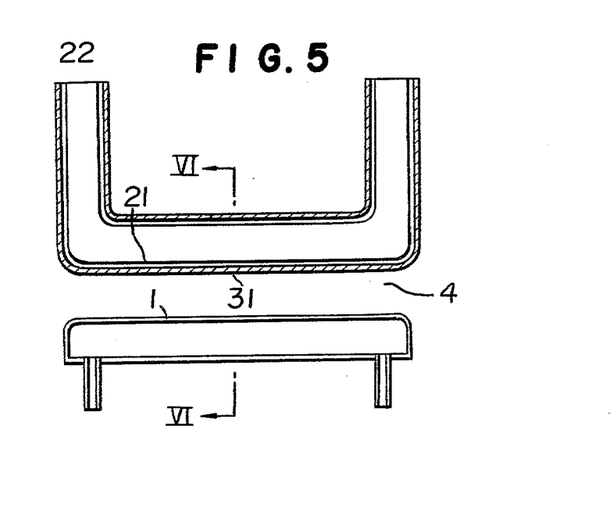
FIG. 5 is a sectional view of one embodiment of electrodes according to the present invention.
Figure 6:
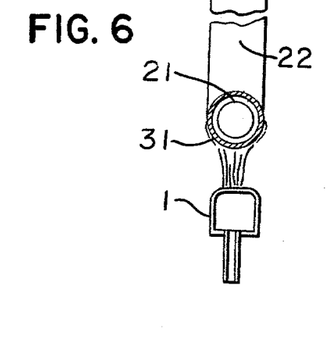
FIG. 6 is a sectional view taken along the line VI—VI of FIG. 5.

FIG. 5 is a vertical sectional view of the discharge electrodes of the grounded metallic electrode (1) and the high voltage side electrode (21) and FIG. 6 is a sectional view taken along the line VI—VI of FIG. 5.

In FIGS. 5 and 6, the grounded metallic electrode is the same as that of the conventional one and accordingly, a detailed description of the grounded metallic electrode is omitted. However, as is clear from FIGS. 5 and 6, the outer surface of high voltage side electrode is coated with a dielectric (31).

The high voltage side electrode (21) is cylindrical and the whole of the outer surface thereof is coated with a dielectric whereby the applied voltage can be increased. The discharge results on the whole surface of the dielectric coating (31) whereby the equivalent electrostatic capacity of the dielectric is increased to be about 3 times that of the conventional one.

When the outer surface diameter of the dielectric (31) is less than several times the length of the discharge space, creeping discharge results and the power loss is not substantially found because the power consumed on the creeping surface is significantly smaller than the power applied in the discharging space (4) based upon experimental results.

The discharge resulting on a whole of the surface of the dielectric (31) will be discussed. This is the phenomenon discovered by the inventors as the result of studies on the silent discharge and it has not been considered according to knowledge on the conventional discharge.

Figure 7:
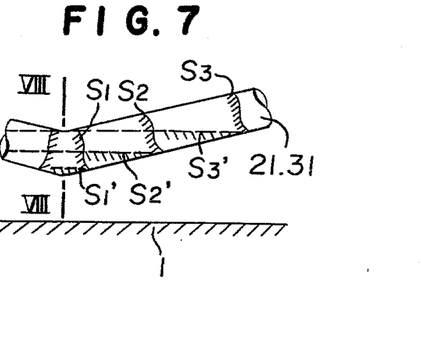
FIG. 7 is a side view for illustrating the relationship between the electrode and the discharge.
Figure 8:
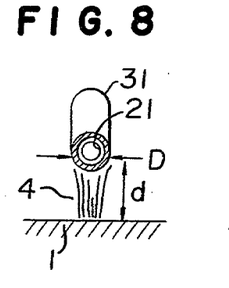
FIG. 8 is a sectional view taken along the line VIII—VIII of FIG. 7.

Referring to FIGS. 7 and 8, the phenomenon will be further illustrated.

FIG. 8 is a sectional view taken along the line VIII—VIII of FIG. 7.

In FIGS. 7 and 8, the reference numeral (1) designates the grounded metallic electrode; (21) designates the high voltage side electrode and (31) designates the dielectric. An AC high voltage is applied between the high voltage side electrode (21) and the grounded metallic electrode (1) and the silent discharge results in the discharging space (4).

In general, the disruptive voltage and the discharge sustaining voltage are shown as a function of a product of a pressure and a space length (d).

In the discharge in the substantially uniform electric field, if the space length (d) in the discharging space (4) is not equal, it is considered that the discharging region is expanded as $(S_1'-S_2'-S_3')$ depending upon the increase of the applied voltage $(V_1-V_2V_3)$.

However, it is found that the practical silent discharge region is expanded as $(S_1 \rightarrow S_2 \rightarrow S_3)$. That is, the total discharge power and discharge density in the discharging space (4) are increased and the area of the dielectric (31) used for the discharge is electrically increased since $S_1'$, $S_2'$ and $S_3'$ are respectively expanded to $S_1$, $S_2$ and $S_3$. This phenomenon is evaluated as the increase of the electrostatic capacity in equivalence.

The consumption of the power on the creeping surface of the dielectric in the electric measurement, is only about 5% in $D/d=1$ about 10% in $D/d=2$ and about 30% in $D/d=3$ (D:diameter of dielectric (31)) in comparison with the power in the discharging space region.

These phenomena show the fact that the sustaining electric field of the dielectric creeping discharge is significantly lower than that of the discharge in the discharing space (4) in the silent discharge condition.

The present invention has been attained by utilizing the special phenomena found by the inventors in the silent discharge.

In accordance with the structure of FIG. 5, the current can be fed from the water cooling inlet (22) of the high voltage side electrode (21) whereby the terminal insulation problem can be improved and the applied voltage can be advantageously increased.

In said embodiment, the sectional shape of the high voltage side electrode (21) coated with the dielectric (31) is round. Thus, the substantially same effect is attained when the whole surface is coated with the dielectric (31) and the equivalent diameter, which is the length of the circumference in cross-section/$\pi$ (the ratio of the circumference to a diameter), is less than several times the length of the discharge space (4) even though the sectional shape of the electrode (21) is elliptical or rectangular.

The substantially same effect is also attained by forming the low voltage side electrode such as the grounded metallic electrode (1) in the same structure as the high voltage side electrode.

The principle of the present invention is applied for improved embodiments.

The electrode covered with the dielectric is divided into a plurality of electrodes whereby the equivalent electrostatic capacity is increased.

Figure 9:
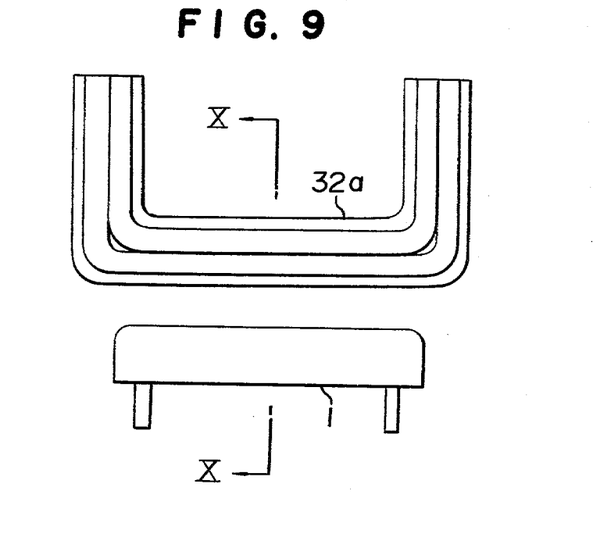
FIG. 9 is a side view of the other embodiment of the electrode according to the present invention.
Figure 10:
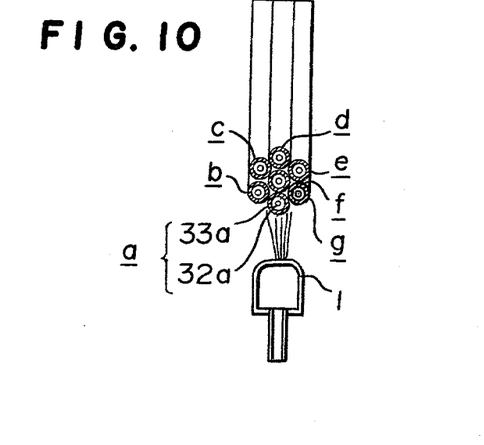
FIG. 10 is a sectional view taken along the line X—X of FIG. 9.

FIGS. 9 and 10 show this improved embodiment. FIG. 9 is a front view and FIG. 10 is a sectional view taken along the line X—X of FIG. 9.

In FIGS. 9 and 10, the reference numeral (33a) designates a dielectric and (32a) designates a high voltage metallic electrode and the electrode (a) is formed by the high voltage metallic electrode (32a) and the dielectric (33a). The electrodes (b) to (g) having the same structure as that of the electrode (a) are closely arranged to form a grouped high voltage side electrode (21). The silent discharge condition occurs on the whole surfaces of the electrodes (a) to (g) when the applied voltage is higher than the discharge initiation voltage.

In such case, the electrostatic capacity is increased to 7/3 times that of one cylindrical electrode having a diameter equal to the total of the diameters of the electrodes (a) to (g) whereby the effect of the present invention is further improved.

The present invention will be further illustrated on a practical device.

Figures 11A, 11B:
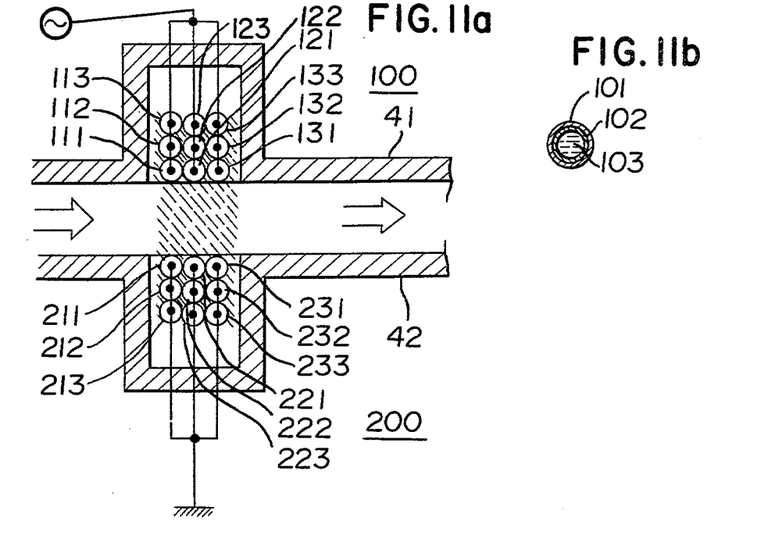
FIGS. 11, 12 and 14 to 17 are respectively sectional views of the other embodiments of the electrodes according to the present invention.

FIG. 11 shows the other embodiment having the grouped electrodes.

In FIG. 11, the reference numeral (100) designates the grouped high voltage side electrode of cylindrical dielectric electrodes (111)–(113), (121)–(123), (131)–(133) which are arranged in the form of 3×3 layers; (200) designates the grouped grounded electrodes of cylindrical dielectric electrodes (211)–(213), (221)–(223), (231)–(233) which are arranged in the form of 3×3 layers.

The dielectric electrodes (111)–(113), (121)–(123), (131)–(133), (211)–(213), (221)–(223) and (231)–(233) are respectively formed by a metallic tube (102) whose whole surfaces are covered with the dielectric (101) such as glass, mica, ceramics and whose inner parts are used for the passage of the coolant water (103).

The reference numerals (41), (42) are respectively guide plates for gas flow which are made of an insulating material such as resin glass ceramics. The silent discharge is the AC discharge through the dielectrics (101) whereby they have the function in the conversion from the silent discharge to the arc discharge of preventing it themselves. That is, it is possible to attain stable non-equilibrium discharge (electron temperature > gas temperature).

However, in said device, the discharge passages for the silent discharge are concentrated to the dielectric electrodes (131), (231) whereby heat energy is easily concentrated to the dielectric electrodes (131), (231). Accordingly, there are certain problems that the electrodes are thermally broken and the discharge on the dielectric electrodes being departed from the discharging part (4) (such as (113)) is passed through the creeping surfaces of the dielectric electrodes in the middle part of the discharge passage (such as (112), (111), (122), (121), (132), (131)) to cause certain energy loss and the energy loss is used for the elevation of the temperature of the coolant water (103) without using the output of the laser.

Figure 12:
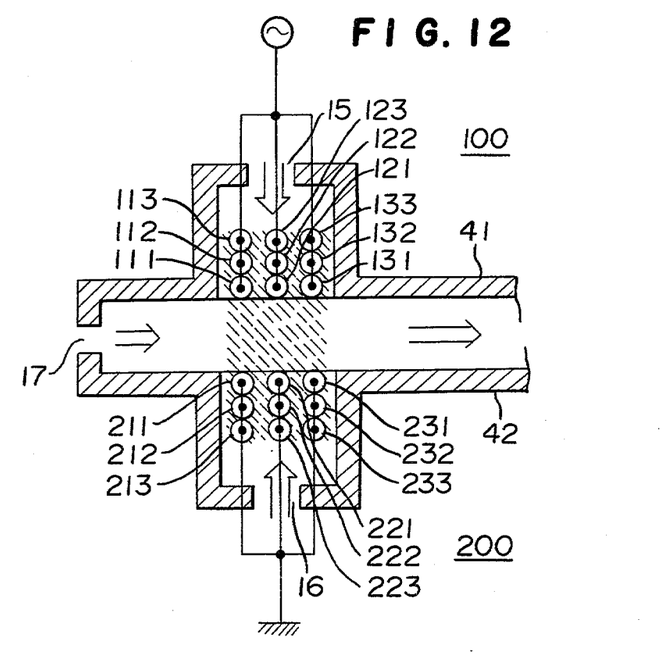

FIG. 12 shows the other embodiment improved so as to overcome said disadvantages.

The embodiment of FIG. 12 is different from that of FIG. 11 based on the following feature.

The dielectric electrodes (111)–(113), (121)–(123), (131)–(133), (211)–(213), (221)–(223), (231)–(233) are respectively arranged with each having a gap of several mm in three rows and slit type gas inlet holes (15), (16), (17) are formed on the gas flow guide plates (41), (42) so as to pass the gas also through the sides of the dielectric electrodes (111)–(113), (121)–(123), (131)–(133), (211)–(213), (221)–(223), (231)–(233). The disadvantages of the embodiment of FIG. 11 are overcome by the improved feature.

Figure 13:
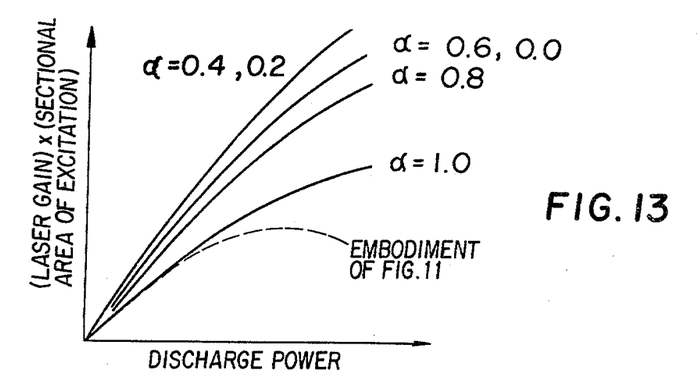
FIG. 13 is a graph showing relationships between (laser gain)×(excited zone sectional area) and discharge power on the embodiments of FIGS. 11 and 12.

FIG. 13 shows effects of the embodiments of FIG. 11 and FIG. 12 which are compared under the same pressure and the same length of the discharge gap. The ratio $\alpha$ of the gas flow passed through the gas inlet holes (17) to the total gas flow passed through the gas inlets (15), (16), (17) under the condition of equal total gas flow is shown as the parameter.

In the case of $\alpha = 1.0$, the gas flow passed along the dielectric electrode creeping surface is not found and it shows only the effect for providing gaps between grouped electrodes arranged in a vertical row.

In the embodiment of FIG. 11, it causes the local elevation of the temperature of the gas caused by the concentration of the discharge passages to the dielectric electrodes (131), (132). Because of the increase of the significant percentage of absorption of laser light caused by the elevation of the temperature of the gas, the phenomenon of decreasing the laser gain while increasing the discharge power is found.

Such phenomenon can be prevented by arranging the grouped electrodes in a vertical row so as to have gaps between them as shown in FIG. 12.

The gap molecules excited by the discharge on the dielectric electrode creeping surfaces are also flowed to the discharge central part by the high speed gas so as to contribute to the excitation of the laser.

In the embodiment of FIG. 12, it is optimum to be $\alpha = 0.2$ to 0.4.

The gas flow in the discharging space (4) between the dielectric electrodes (111), (211) is small, in the case of $\alpha = 0$ whereby the temperature of the gas at this part is highly elevated and the gain characteristic is slightly inferior to that of the case of $\alpha = 0.2$ to 0.4. However, it is possible to attain uniform distribution of the discharge passages and effective utilization of the excited molecules on the dielectric electrode creeping surfaces.

The effect is improved in a range of 1 to 10 mm of each gap between the grouped dielectric electrodes (111)–(113), (121)–(123), (131)–(133), (211)–(213), (221)–(223), (231)–(233) arranged in vertical rows, under the consideration of the resistance to the gas flow and the uniform distribution of the excited molecules.

FIGS. 14 to 17 show the other embodiments of the present invention.

Figure 14:
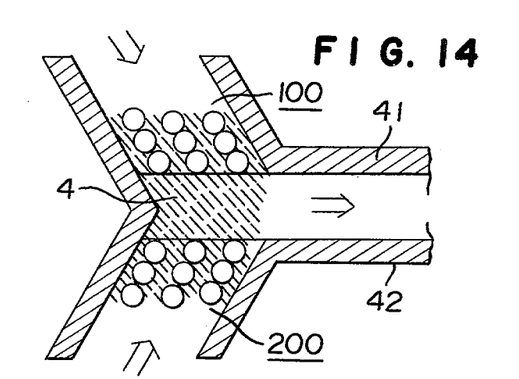

In the embodiment of FIG. 14, the gas flow from the gas inlet holes (15), (16) to the electrodes (100), (200) is in slant flow so as to cause the confluence at the discharging space (4) and the gas flow in the discharging space (4) is smooth without stay. This feature is different from that of FIG. 12.

Figure 15A:
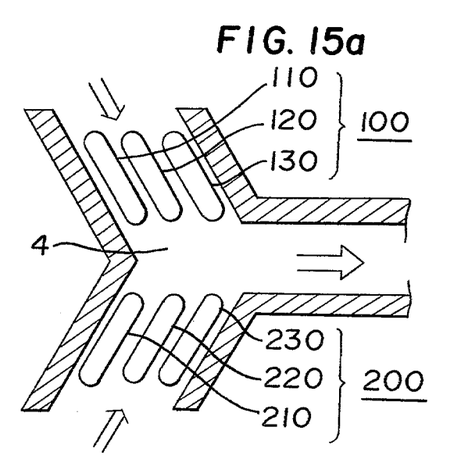
Figure 15B:
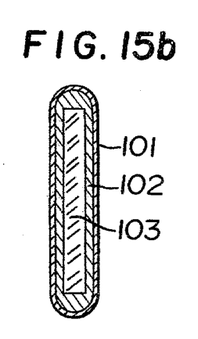

In the embodiment of FIG. 15, the sectional shapes of the dielectric electrodes (110), (120), (130), (210), (220), (230) as the grouped electrodes (100), (200) are in a rectangular form such as that of the metallic enclosure (102) shown in FIG. 15 (b) so as to decrease the resistance of the flow on the creeping surfaces of the dielectric electrodes (110), (120), (130), (210), (220), (230) whereby the gas flow passed on the creeping surfaces is faster and the gas molecules excited on the creeping surfaces are effectively fed to the discharging space (4). This feature is different from that of FIG. 14.

The dielectric electrodes (110)–(130), (210)–(230) of the grouped electrodes (100), (200) are in the same potential as the same electrodes of FIG. 12.

Figure 16:
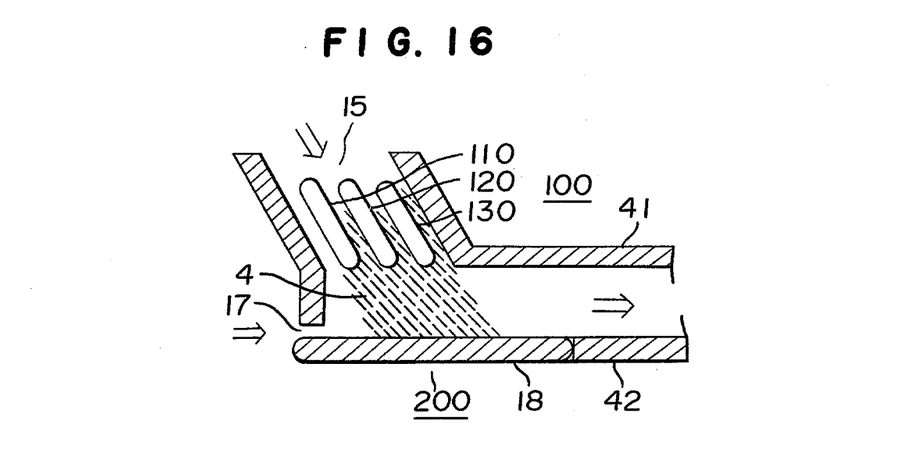

In the embodiment of FIG. 16, the electrodes (200) in one side of the device are a metallic flat plate electrode (18) having lattice or slits whose front surface faces to the discharge space whereby a part of a laser gas passes through the lattice or slit into the discharge space. This feature differs from that of FIG. 15.

The number of the dielectric electrodes is decreased by one half whereby the total electrostatic capacity is two times that of FIG. 15 and a larger discharge power can be advantageously fed. In this embodiment, sometimes, the metallic flat plate electrode (18) causes a local concentration of the discharge (under high pressure and high discharge power). Accordingly, the gas inlet hole (17) is formed near the metallic flat plate electrode (18). In the case of discharge under low pressure of less than 100 torr, the gas inlet hole (17) can be eliminated.

Figure 17:
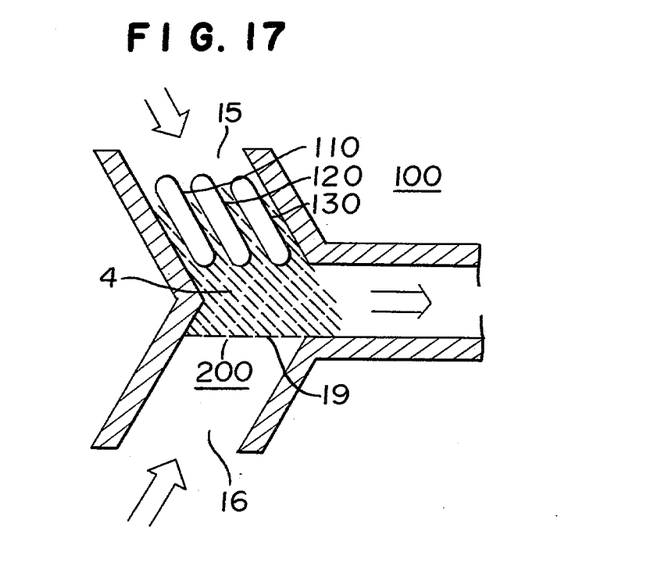

In the embodiment of FIG. 17, the electrode (200) in one side is a flat net electrode (19) and the gas flow is passed from the gas inlet (16) through the net electrode so as to cause confluence with the gas flow passed through the grouped electrodes (100) at the discharging space (4). This feature differs from that of FIG. 15.

In accordance with the present invention, at least one side electrode of the high voltage side electrode and the low voltage side electrode is covered with a dielectric over substantially all of its surface and the equivalent diameter of the electrode is less than several times the length of the discharging gap whereby a silent discharge having high discharge density can be attained while maintaining a relatively low frequency and the costs of the parts such as power source and the transformer can be advantageously low and the total cost of the device can be low.

What is claimed is:

1. In a silent discharge type gas laser device comprising a high voltage side electrode and a low voltage side electrode with the space therebetween forming a discharging space, the improvement being that all of the surface area of at least one of the electrodes is covered with a dielectric and an equivalent diameter of the electrode covered with said dielectric is in a range up to 3 times the length of the discharge space.

2. A silent discharge type gas laser device according to claim 1 wherein at least one of the high voltage side electrode and the low voltage side electrode is formed by a plurality of electrodes whose whole surfaces are covered with the dielectric.

3. A silent discharge type gas laser device according to claim 2 wherein the plurality of electrodes are arranged in the flow path of a gas flow through said discharging space.

4. A silent discharge type gas laser device according to claim 2 wherein the plurality of electrodes are arranged with a specified space therebetween so as to pass a laser gas in the direction of the discharging space.

5. A silent discharge type gas laser device according to claim 4 wherein one of the high voltage side electrode and the low voltage side electrode is formed by a flat metallic plate whose front surface faces the discharging space.

6. A silent discharge type gas laser device according to claim 1, 2, 3 or 4 wherein one of the high voltage side electrode and the low voltage side electrode is formed by a flat net electrode in the for of a wire gauze whose front surface faces to the discharge space whereby a part of a laser gas is passed through the gauze into the discharging space.

7. A silent discharge type gas laser device according to claim 1, 2, 3 or 4 wherein one of the high voltage side electrode and the low voltage side electrode is formed by a flat metallic substrate having lattice or slits whose front surface faces to the discharge space whereby a part of a laser gas is passed through the lattice or slits into the discharging space.

* * * * *

UNITED STATES PATENT AND TRADEMARK OFFICE
CERTIFICATE OF CORRECTION

PATENT NO. : 4,247,829
DATED : January 27, 1981
INVENTOR(S) : SHIGENORI YAGI ET AL It is certified that error appears in the above-identified patent and that said Letters Patent are hereby corrected as shown below:

Column 8 line 22 delete "in the for of" and insert --in the form of--.

Signed and Sealed this

Second Day of June 1981

[SEAL]

Attest:

RENE D. TEGTMEYER

Attesting Officer

Acting Commissioner of Patents and Trademarks